United States Patent [19]

Fossey

[11] Patent Number: 4,809,873
[45] Date of Patent: Mar. 7, 1989

[54] NECK FRAME FOR A CONTAINER

[75] Inventor: Robin E. Fossey, Redhills, Ireland

[73] Assignee: Container Design Limited, Dublin, Ireland

[21] Appl. No.: 55,397

[22] Filed: May 28, 1987

[30] Foreign Application Priority Data

May 30, 1986 [IE] Ireland ................................. 1431/86

[51] Int. Cl.$^4$ ............................................ B65D 45/16
[52] U.S. Cl. .................................. 220/324; 105/308.1
[58] Field of Search ............ 220/314, 324, 344, 86 R; 105/308.1, 377; 114/230

[56] References Cited

U.S. PATENT DOCUMENTS

| | | | |
|---|---|---|---|
| 1,385,836 | 7/1921 | Kerr | 220/1.5 |
| 1,612,512 | 12/1926 | Keene | 220/73 |
| 1,665,369 | 4/1928 | Joy et al. | 220/344 |
| 1,671,138 | 5/1928 | Tiley | 220/73 |
| 2,684,779 | 7/1954 | Rafferty | 220/86 R |
| 3,074,590 | 1/1963 | Jurs et al. | 220/344 |
| 4,157,146 | 6/1979 | Svenson | 220/324 |
| 4,411,371 | 10/1983 | Collier et al. | 220/314 |
| 4,555,041 | 11/1985 | Muehl | 220/324 |
| 4,570,816 | 2/1986 | Ferris et al. | 220/317 |

Primary Examiner—George T. Hall

[57] ABSTRACT

A neck frame for an opening to a container constructed to ISO specifications. The neck frame comprises a tubular member, a compensating flange and a second flange extending around the tubular member, all cast integrally of stainless steel. A lid is pivotal on mounting brackets cast integrally on the second flange and is secured to the tubular member by eye bolts pivotal in brackets also cast integrally with the second flange.

10 Claims, 4 Drawing Sheets

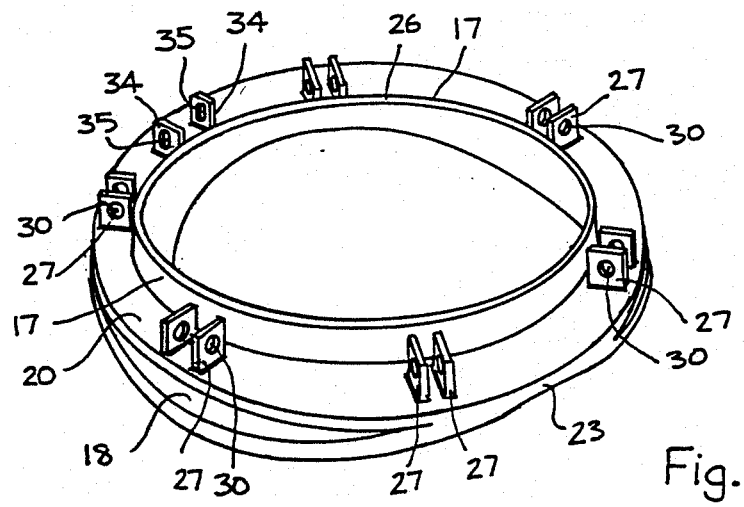
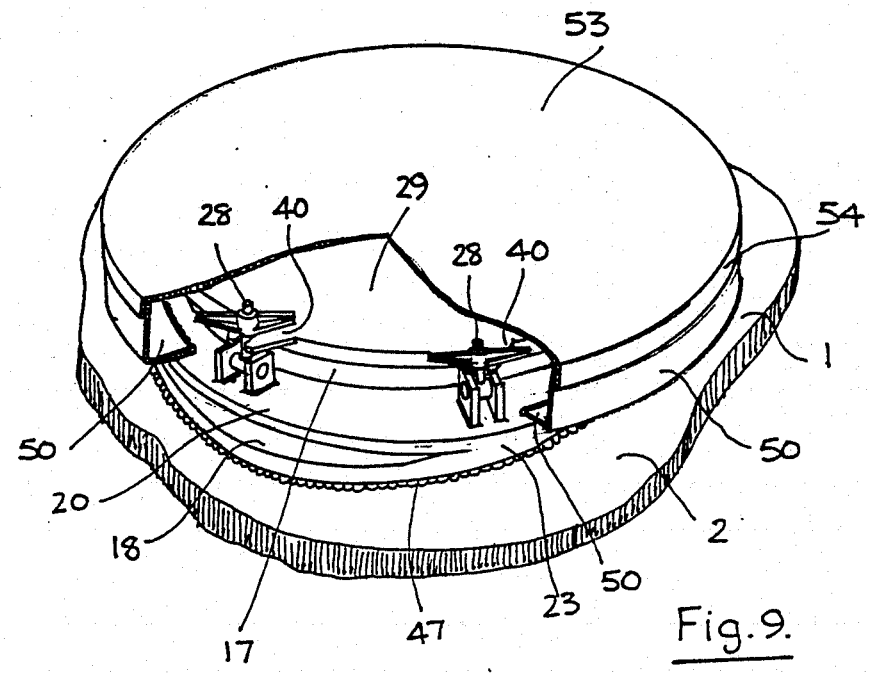

NECK FRAME FOR A CONTAINER

FIELD OF THE INVENTION

The present invention relates to a neck frame for an opening into a container, such as, for example, a manhole into a container, and in particular, though not limited to a container for bulk materials, such as liquids or other such materials with fluid like characteristics.

BACKGROUND TO THE INVENTION

In general, such containers are formed from an elongated tubular body portion, such as a cylinder, which is closed by end caps. Usually, the end caps are dished, and convex outwardly. Two support frames are provided at each end of the cylindrical container for lifting, stacking and the like. Alternatively, the container may be mounted in a framework. In other cases, the container may be fixedly mounted to a truck body, chassis or framework. In general, such containers are made to International Standard Organisation (ISO) specifications. Although, they may be of any other shape, size or construction, and may be made to other standards and specifications.

Where it is necessary to provide an opening such as, for example, a hand opening or a man opening into the container, in general, such openings are provided on the cylindrical surface. An opening of the desired size, usually circular, is cut in the cylindrical surface. A tubular member formed by a substantially circular side wall which is longitudinally seam-welded, and which forms portion of a neck frame is set into the opening and welded to and around the periphery of the opening. A compensating flange, which also forms part of the neck frame to compensate for the loss of inherent strength in the container as a result of forming the opening, is then welded around the side wall and also to the container. Brackets to pivotally support eye bolts for securing a closure member, namely a lid, to the neck frame are usually welded in pairs around the outer surface of the side wall.

This construction of neck frame has many disadvantages. Firstly, the construction of the neck and welding it to the container is a slow, tedious and time consuming task. Secondly, and more importantly, it has been found that welding the side walls of the neck frame to the container opening and the flange causes considerable distortion of both the container and the tubular neck. Thirdly, the actual welding of the tubular neck and compensating flange to the container causes further loss of inherent strength of the container. Fourthly, the welding of the eye brackets to the tubular neck further leads to distortion of the neck. Distortion of the tubular neck, it will be appreciated, is a particular serious matter. Since in most cases it is essential that the lid must sealably engage the tubular neck, any distortion in the neck will prevent the formation of an adequate seal between the lid and the tubular neck. To overcome this problem, and to achieve some form of reasonable seal between the lid and the tubular neck, it has in the past been necessary to carry out further machining to either the tubular neck after it and the compensating flange have been welded to the container, and/or alternatively, to carry out further machining to the lid to compensate for the distortion. This is particularly unsatisfactory, in that in most cases it is particularly difficult to machine the neck after it has been welded into position, and machining of the lid is also only a partly satisfactory solution.

There is therefore a need for a neck frame which overcomes the problems of neck frames known heretofore.

OBJECTS OF THE INVENTION

One object of the invention is to provide a neck frame for an opening into a container which can be mounted to the container with the minimum amount of distortion being caused to the container and the neck frame. It is also an object of the invention to provide a neck frame, which, when being secured to the container, does not distort, or if it does, the distortion is minimal, and is not detrimental to the formation of a seal between the neck frame and a lid on the neck frame. It is also an object of the invention to provide a neck frame, which, when secured to the container, maintains any loss of strength in the container at a minimum which would normally be caused by forming an opening in the container. Indeed, it is an object of the invention to, where possible, eliminate any loss of strength in the container as a result of forming the opening. It is also an object of the invention to provide securing means on the neck frame for securing a lid which avoids any distortion of either the neck frame or the lid. Another object of the invention is to provide a neck frame which may be machined subsequent to it being formed, and prior to it being mounted on the container, and in particular, which may be machined to provide a machined abutting surface to the lid to form an adequate seal between the lid and the neck frame. Another object of the invention is to provide a neck frame which may be fitted relatively easily and efficiently to a container.

It is also an object of the invention to provide a container incorporating the neck frame of the invention.

SUMMARY OF THE INVENTION

According to the invention, there is provided a neck frame for an opening into a container, the neck frame comprising a tubular member open at both ends to form a duct to the opening, and a compensating flange extending transversely from the tubular member and formed integrally therewith for, in use, engaging the surface of the container adjacent the opening.

Advantageously, the tubular member and compensating flange are formed integrally as a casting.

In one embodiment of the invention, the compensating flange comprises an abutting surface for, in use, abutting the surface of the container adjacent the opening, the abutting surface defining the surface of the container adjacent the opening.

In another embodiment of the invention the abutting surface of the compensating flange is of arcuate shape to define portion of a cylindrical surface, the axis of the centre of curvature of the abutting surface being substantially perpendicular to the longitudinal axis of the tubular member.

In a further embodiment of the invention, the tubular member is of circular cross section, the compensating flange extending completely around and radially outwardly of the tubular member, and a first end of the tubular member terminating in the abutting surface of the compensating flange.

In a still further embodiment of the invention, a second flange extends completely around the tubular member, the second flange merging with the compensating flange in two positions on opposite sides of the tubular member.

Preferably, a closure member to close the second end of the tubular member is provided.

Advantageously, mounting means are provided on the second flange to pivotally mount the closure member relative to the tubular member, and securing means are provided on the second flange for releasably securing the closure member closed.

Additionally, the invention provides a container comprising an elongated tubular body portion closed by end caps, and having an opening to provide access to the interior of the container, and a neck frame mounted around the opening, wherein the neck frame is a neck frame according to the invention.

Preferably, the opening is provided on the tubular body portion of the container, and the neck frame is mounted around the opening.

ADVANTAGES OF THE INVENTION

The advantages of the invention are many. One of the most important advantages is that by virtue of the fact that the tubular member and compensating flange are formed in one piece, the neck frame may be machined subsequent to it being formed, and prior to mounting on the container. Thus, the end of the neck frame which engages the lid can be machined prior to mounting the neck frame on the container.

Furthermore, because the neck frame and flange are formed in one integral piece, when the neck frame is being secured to the container, it has been found that no distortion of the neck frame takes place, and indeed, it has also been found that distortion of the container is avoided. Even where the neck frame is secured to the container by welding the compensating flange to the container, it has also been found that virtually no distortion of either the neck frame or tank takes place. Indeed, if any such distortion does take place, it has been found that its effect on providing a seal between the lid and the neck frame is not detrimental to achieving a good seal.

It has been found that further advantages arise when the tubular member and compensating flange are integrally formed as a casting. In particular, it has been found that when the neck frame is welded to the container, virtually no distortion of either the neck frame or container takes place. Further, it has been found that the neck frame compensates, in most cases, entirely for any loss of inherent strength of the container, which resulted from forming the opening in the container.

Where the compensating flange has an abutting surface to abut, in use, the surface of the container adjacent the opening, the container is further strengthed by the neck frame, and it has also been found that distortion of the neck frame and the container are virtually eliminated. A further advantage of the invention is that the neck frame is ideally suited for mounting on a container having a tubular body portion formed by a cylinder, and because the compensating flange defines the shape of portion of the cylindrical surface of the container, a tight fit between the compensating flange and the container is achieved, which further facilitates in the elimination of distortion of both the neck frame and the container and also increases the strength of the container.

The advantage of providing a circular tubular member is that the neck frame is ideally suited for a circular opening into a container and furthermore, additional strength is achieved by a circular neck frame. Where the compensating flange extends completely around the tubular member, additional strength is added to the container, and furthermore, it has been found that no distortion at all of the neck frame or the container occurs when the neck frame is being secured to the container, even where it is being secured by welding. Indeed, a further advantage is that the neck frame is provided with additional strength by virtue of the fact that the tubular member extends through the flange to terminate in the abutting surface. This further adds strength to the neck frame, and in turn to the container.

These and other advantages and objects of the invention will be readily apparent from the following description of some preferred embodiments thereof, given by way of non-limiting examples only, with reference to the accompanying drawings.

BRIEF DESCRIPTION OF THE DRAWINGS

FIG. 7 is a perspective view of portion of the neck frame of FIG. 2,

FIG. 9 is a perspective view of a neck frame according to another embodiment of the invention.

DETAILED DESCRIPTION OF THE INVENTION

Figure 8:
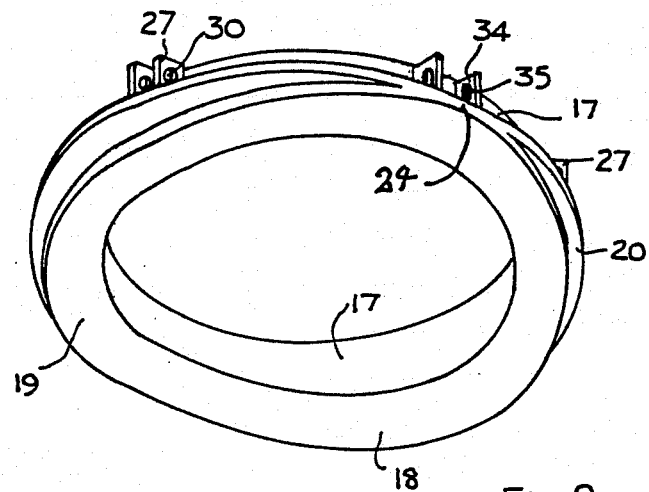
FIG. 8 is an underneath perspective view of the portion of the neck frame of FIG. 7.
Figure 1:
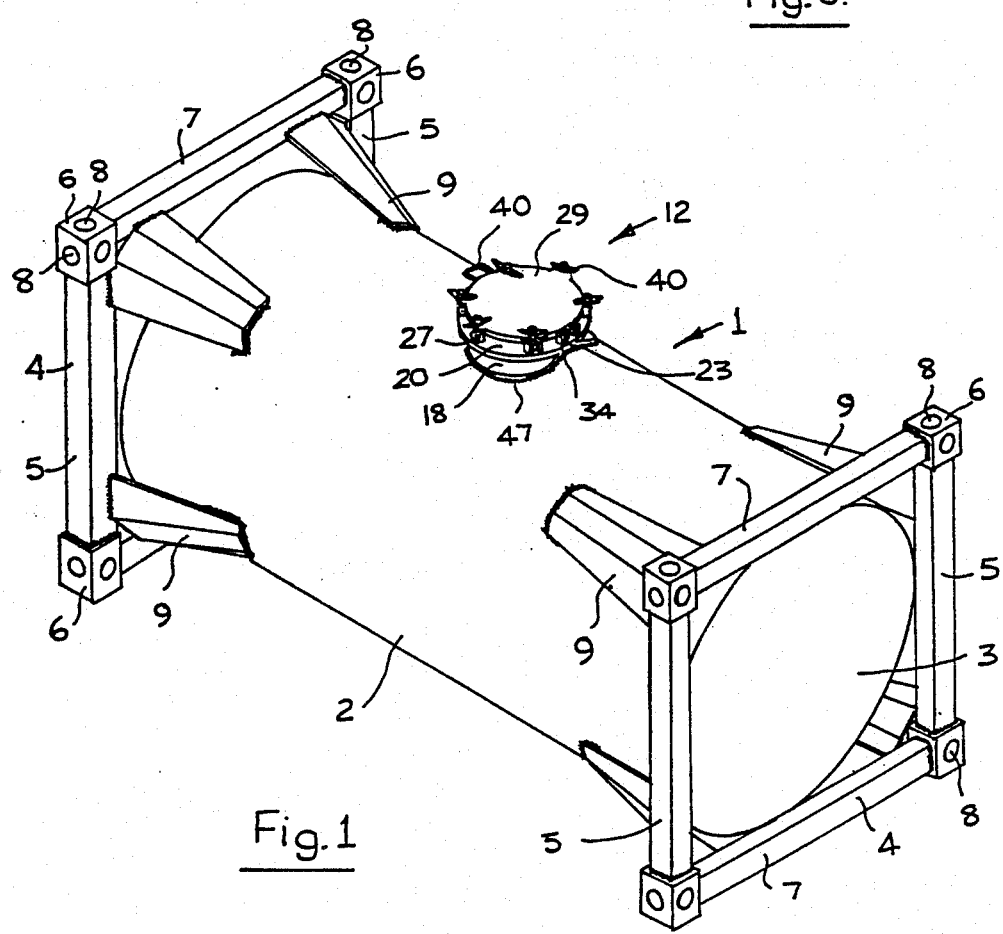
FIG. 1 is a perspective view of a container according to the invention with a neck frame also according to the invention mounted thereon.

Referring to the drawings, and initially to FIGS. 1 to 8 there is illustrated a container according to the invention, indicated generally by the reference numeral 1, which is constructed to International Standard Organisation (ISO) specifications. The container 1 comprises a tubular body portion which in this case is formed by a cylinder 2 which terminates in a pair of convex end caps 3 all of stainless steel. The cylinder 2 is mounted between a pair of end frames 4, each of which comprise a pair of uprights 5, which terminate in corner pieces 6, and are joined by cross members 7. The corner pieces 6 are provided with fixing sockets 8 to ISO specifications. Struts 9 extend from the end frames 4 to engage the cylindrical surface of the cylinder 2, and to support the cylinder 2 between the frames 4. The struts 9 are welded to the cylinder 2 and the end frames 4.

A neck frame 12 also according to the invention is mounted on the top of the cylinder 2 to provide access through a man opening 14 into the interior 15 of the container 1. The neck frame 12 is formed integrally in one piece, and in this case, is formed of a stainless steel casting. The neck frame 12 comprises a tubular member 17 with a transversely arranged compensating flange 18 which extends radially outwardly of the tubular member 17. The internal diameter of the tubular member 17 substantially co-incides with the diameter of the opening 14. A face 19 of the compensating flange 18 forms an abutment surface which abuts portion of the surface of the cylinder 2 of the container 1 adjacent the opening 14. As can be seen the abutment surface 19 is of arcuate shape, and defines the portion of the surface of the cylinder 2. Accordingly, its centre of curvature is along an axis which extends substantially perpendicularly to the axis of the tubular member 17. As can be seen, the tubular member 17 terminates in the compensating flange 18 in the abutting surface 19.

A second flange 20 also extends radially outwardly around the tubular member 17. This flange 20 as well as the compensating flange 18 are all formed integrally as a single casting with the tubular member 17. The second flange 20 merges with the compensating flange 18 at two positions, namely 23 and 24 at opposite sides of the tubular member 17. The second flange 20 carries a plurality of securing means provided by pairs of brackets 27 which support eye bolts 28 for securing a closure member, namely a lid 29, to the tubular member 17. Holes 30 in the brackets 27 engage pivot pins 31 on which the eye bolts 28 are pivotal. As can be seen, the pairs of brackets 27 are provided at 60° intervals around the second flange 20. Mounting means for pivotally mounting the lid 29 are provided by a pair of mounting brackets 34 extending upwardly from the second flange 20. Holes 35 in the mounting brackets 34 engage a pivot pin 36 for pivoting the lid 29 as will be described below. The holes 35 are slightly elongated to facilitate vertical movement of the pivot pin 36 in the holes 35, also as will be described below. The brackets 27 and mounting brackets 34 are all of cast stainless steel and are cast integrally with the tubular member 17 and the flanges 18 and 20.

The lid 29 is also cast in one piece of stainless steel, and is of circular shape. A pair of pivot brackets 38 extend from the lid 29 to engage the pivot pin 36 in the mounting brackets 34 for pivoting the lid 29. Stop washers 39 welded on the pivot pin 36 secure the pin 36 in the brackets 34 and 38. Six pairs of receiver brackets 40 corresponding to the brackets 27 extend outwardly from the lid 29 to engage the eye bolts 28. The pivot brackets 38 and receiver brackets 40 are all cast integrally with the lid 29. Wing nuts 42 on the eye bolts 28 secure the lid 29 to the tubular member 17. An annular groove 43 extending around the lid 29 accommodates a sealing gasket 44 to engage and form a seal with the tubular member 17. The elongated holes 35 in the pivot brackets 34 accordingly accommodate vertical movement of the pivot pin 36 which accordingly permits vertical movement of the lid 29 relative to the tubular member 17. This enables an even seal to be formed completely around the tubular member 17 between the gasket 44 of the lid 29 and the tubular member 17. A handle 45 is welded to the lid 29.

On casting the neck frame 12, a top edge 26 of the tubular member 17 is machined to present a smooth, flat, even surface for sealing engagement with the gasket 24 of the lid 29. After machining the lid 29 is then assembled to the neck frame 12.

Figures 2, 3:
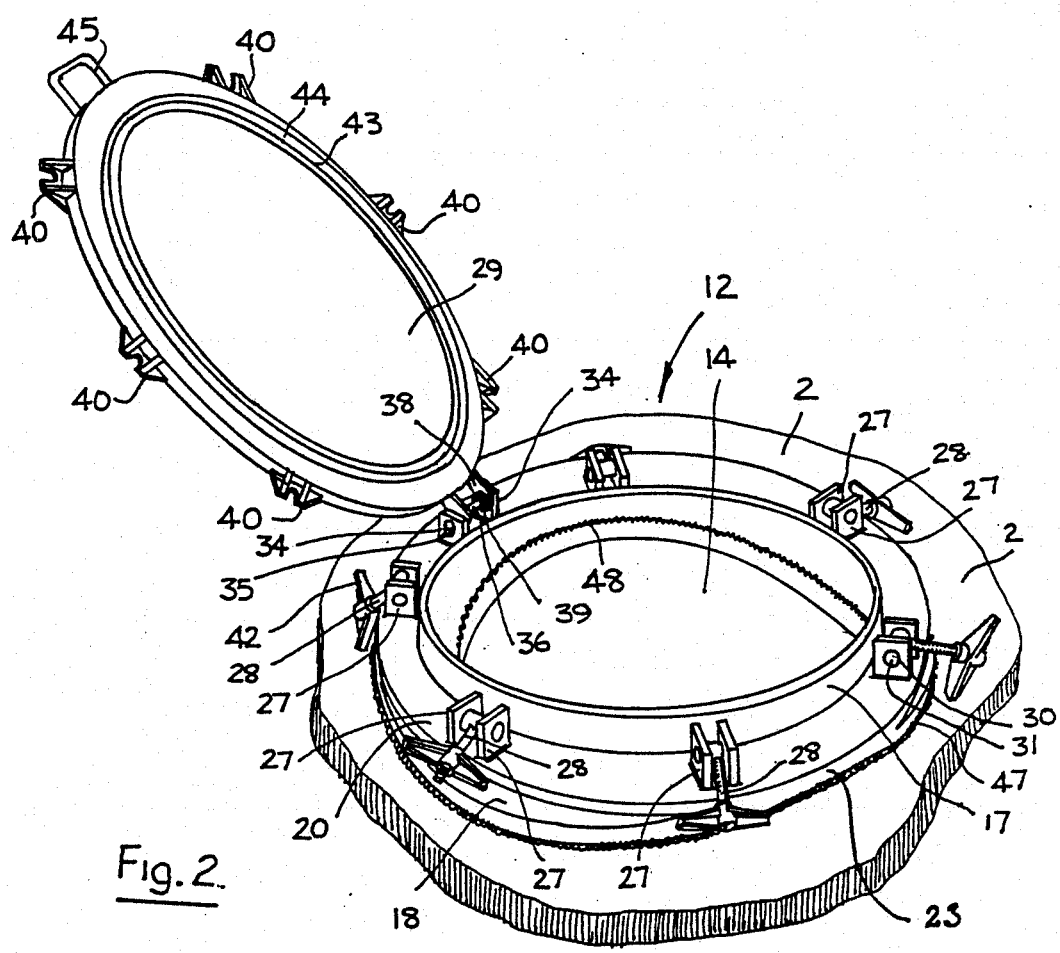
FIG. 2 is a perspective view of the neck frame illustrated in FIG. 1.
FIG. 3 is a cut-away perspective view of the neck frame of FIG. 2.
Figure 5:
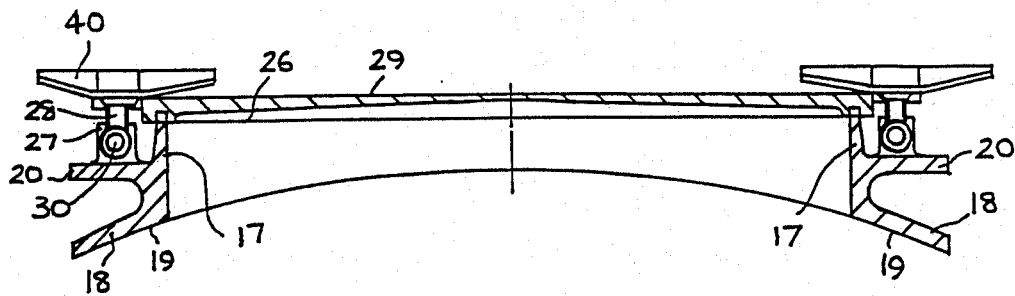
FIG. 5 is a sectional view of the neck frame on the lines V—V of FIG. 4.
Figure 4:
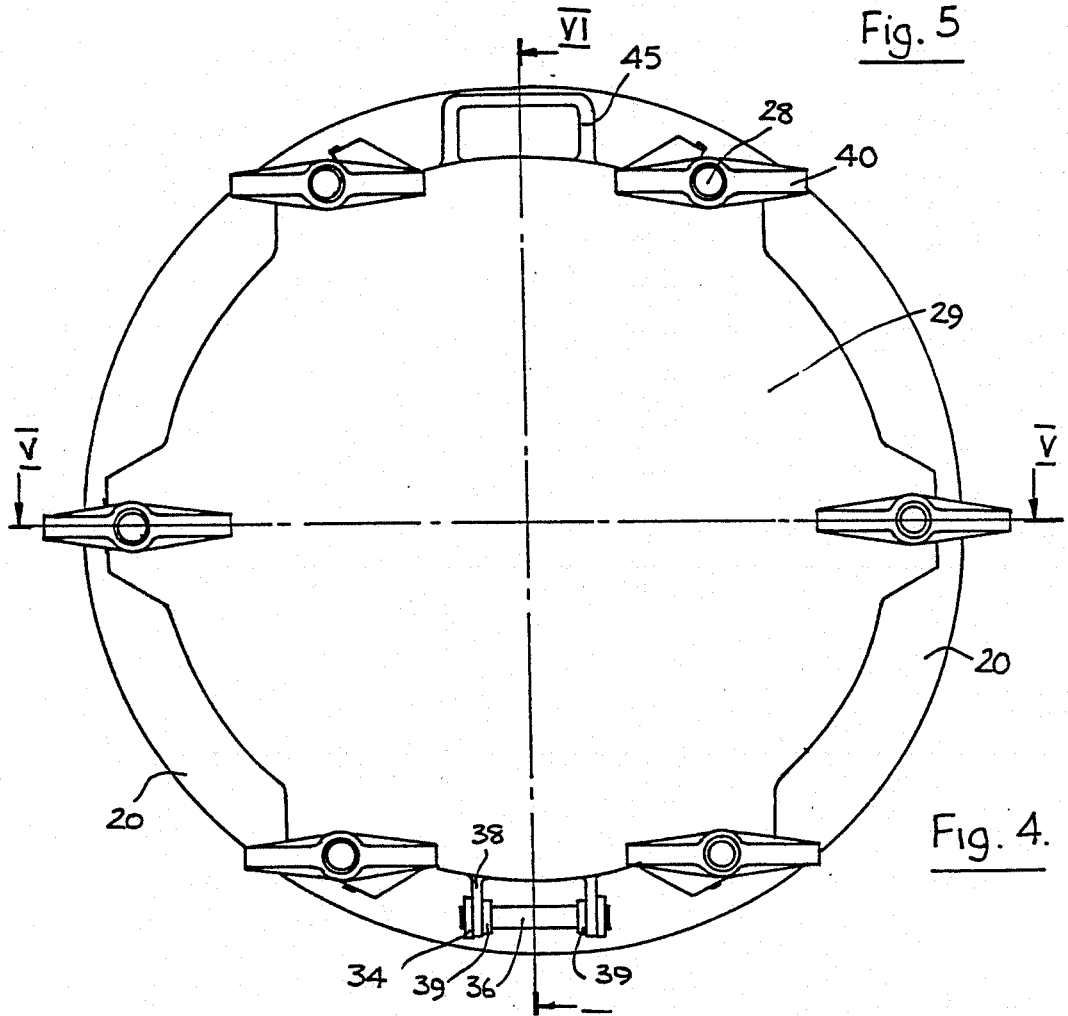
FIG. 4 is a plan view of the neck frame of FIG. 2.
Figure 6:
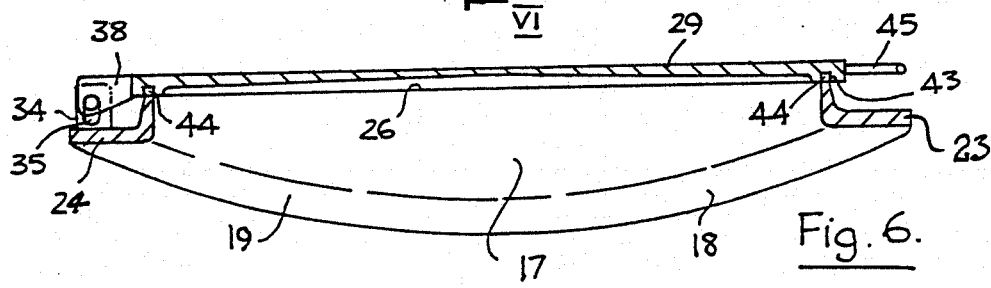
FIG. 6 is a sectional view of the neck frame on the lines VI—VI of FIG. 4.

In use, the neck frame 1 is mounted on the cylinder 2 of the container 1 around the opening 14, so that the inner surface of the tubular member 17 aligns with the opening 14, see FIG. 2. The compensating flange 18 is welded around its periphery at 47 to the surface of the container 1, and the inner portion of the compensating flange 18 adjacent the tubular member 17 is also welded around the periphery of the opening 14 at 48, see FIG. 2. Thus, the neck frame 12 is secured to the cylinder 2 of the container 1, and the tubular member 17 provides a duct into the opening 14. If the lid 29 is not already mounted to the neck frame 12, the lid 29 is then mounted in position.

A particular advantage of the neck frame according to the invention is achieved by virtue of the fact that because the neck frame is cast in one single integral unit, it has considerable inherent strength. Furthermore, also because the neck frame is formed as one integral unit, the amount of welding required to secure the neck frame to the tank is kept to an absolute minimum. These two advantages are particularly important in that by virtue of its own inherent strength, the neck frame tends to compensate entirely for any loss of inherent strength of the container as a result of forming the opening in the container. Furthermore, because of the relatively small amount of welding required, virtually no distortion, and in many cases, no distortion at all is caused to the container when the neck frame is being secured to the container. Furthermore, because of its own inherent strength, welding of the neck frame to the container also causes virtually no distortion, and in many cases absolutely no distortion of the neck frame. Therefore, perfectly adequate sealing is achieved between the lid and the neck frame. Indeed, it is envisaged that the neck frame may be secured to the container by other means besides welding, for example, by nuts and bolts or the like, and in such cases, similar advantages are achieved.

Furthermore, by virtue of the fact that the eye bolt brackets 27 are mounted on the second flange 20, the top edge 26 of the tubular member 17 may be machined to any desired height to accommodate different types or constructions of lid. This has not been possible with neck frames known heretofore, since in all cases, the eye bolt brackets or other mounting brackets have been mounted on the side wall. Thus, any machining of the top edge of the side walls would require machining of the brackets and this would not be feasible.

A further advantage of the invention is that by virtue of the fact that the neck frame is constructed of a single integral casting, the tubular members 17 can be constructed of a considerably shorter member than tubular members of neck frames known heretofore. This has the advantage that it provides the container with a lower profile than those known heretofore, which further provides protection against damage. In the case of the neck frame just described, the height of the tubular member at its shortest parts at 23 and 24 where the two flanges 18 and 20 merge is 30 mm. While in neck frames known heretofore, the equivalent height would be up to 120 mm. Nevertheless to say, the neck frame according to the present invention also improves the security of the tank.

Referring now to FIG. 9 there is illustrated a neck frame according to another embodiment of the invention. In this case, the neck frame is substantially similar to that described, and similar components are identified by the same reference numerals. The main difference between this neck frame and that described is that a cylindrical casing 50 of sheet stainless steel is mounted on the second flange 20. This is mounted for protective purposes. The cylindrical casing 50 is formed by rolling and bending. An inwardly directed flange 51 is secured to the second flange 20 by welding. A lid 53 also of sheet stainless steel having a downwardly directed rim 54 releasably engages the casing 50.

It is envisaged that while in the preferred embodiments of the invention described the neck frame has been described as being of cast stainless steel, it could be of any suitable cast material. Indeed, in certain cases, it is envisaged that instead of being cast, the neck frame may be formed integrally by forging, by fabrication or by any other suitable forming means. It is also envisaged that in certain cases the neck frame may be machined from a solid, or a hollow sleeve like member. Furthermore, while the lid has been described as being of cast stainless steel, it will be appreciated that the lid may be of any other suitable material, and/or may be fabricated, forged, machined or the like. It will also be appreciated that while in the embodiments of the invention described the top of the tubular member has been described as being machined this, in certain cases, may not be necessary.

It will, of course, be appreciated that while eye bolts have been described for securing the lid to the neck frame, any other suitable fastening or securing means could be provided without departing from the scope of the invention. Indeed, in certain cases, it is envisaged that the securing means could be provided by a simple lock between the lid and neck frame. In which case, the hinge and lock would bear any pressure loads acting on the lid. Further, it will of course be appreciated that while it is preferable that the brackets 27 and the brackets 34 should be mounted on the second flange, this is not essential, they may if desired be mounted on the tubular member 17. Further, it is envisaged in certain cases that the second flange may be dispensed with altogether, and in which case the brackets 27 and mounting brackets 34 would extend upwardly from the compensating flange. Indeed, in certain cases, it is envisaged that the second flange and the compensating flange may be formed as one solid flange.

It is also envisaged that in certain cases that the brackets 27 or mounting brackets 34 instead of being integrally cast with the neck frame could be mounted to the neck frame after casting, for example, the various brackets or other suitable securing means could be welded on after casting of the compensating flange and tubular member. Indeed, it is also envisaged in certain cases that the second flange may be formed separately from the tubular member 17 and compensating flange 18 and may be secured to the tubular member 17 later, for example, by welding or any other suitable fastening means, such as, for example, screws, nuts, bolts or the like.

While the neck frame has been described as providing a neck frame for a man opening into a container, it could be used for providing a neck frame for any size or shape of opening. For example, it could be used for a hand opening or the like. Furthermore, it is envisaged that the neck frame may be suitable for an opening of any shape besides a circular opening. For example, the tubular member could be of any cross section besides being circular, for example, it is envisaged that the tubular member may be of hexagonal, octogonal, square, rectangular, triangular, or indeed any other desired cross section.

It is also envisaged that instead of the abutting surface of the compensating flange defining the surface of a cylindrical container, it could define any other shape of container. Needless to say, it could be mounted to any other shape of container, for example, it could be mounted to a flat surface of a square container, or indeed, in certain cases, it is envisaged that it may be adapted for mounting along a corner between two flat surfaces, or indeed, two curved surfaces of a container. It is also envisaged that the neck frame may be mounted on a convex end cap of the container. It will be appreciated by those skilled in the art that the neck frame could be mounted to any container of any shape, size or construction, and it will also of course be appreciated that it is not necessary that the container should be constructed to ISO standards. Nor is it necessary that the container should be mounted between a pair of end frames, it could be a container mounted on a truck base, a chassis or frame.

While the compensating flange and second flange have both been described as extending completely around the tubular member 17, while this is undoubtedly preferable, it is not absolutely essential. In certain cases, it is evisaged that the compensating flange may extend only partly around the tubular member 17, and in certain cases, may extend only partly around on both sides of the tubular member. Similarly, the second member may only extend partly around or partly around on both sides of the tubular member. Further, it is envisaged in certain cases that the compensating flange may extend inwardly of the tubular member 17 rather than outwardly as described. Where the compensating flange extends inwardly, it similar may in certain cases only extend partly around the interior of the tubular member, or indeed, partly around opposite sides or the like. It is also envisaged that while the compensating flange and second flange have been described as merging together two opposite sides of the tubular member, this is not necessary, in certain cases, it is envisaged that they may not merge at all, or may only merge at one point.

I claim:

1. A neck frame for an opening into a container, the neck frame comprising;
    a tubular member open at both ends to form a duct to the opening,
    a compensating flange extending transversely from the tubular member and formed integrally therewith for, in use, engaging the surface of the container adjacent the opening, and
    a second flange extending completely around the tubular member, the second flange merging with the compensating flange at at least one position.

2. A neck frame as claimed in claim 1 in which the tubular member, compensating flange and the second flange are formed of a casting.

3. A neck frame as claimed in claim 1 in which the compensating flange comprises an abutting surface for, in use, abutting the surface of the container adjacent the opening, the abutting surface defining the surface of the container adjacent the opening.

4. A neck frame as claimed in claim 3 in which the abutting surface of the compensating flange is of arcuate shape to define portion of a cylindrical surface, the axis of the centre of curvature of the abutting surface being substantially perpendicular to the longitudinal axis of the tubular member.

5. A neck frame as claimed in claim 3 in which the tubular member is of circular cross section, the compensating flange extending completely around and radially outwardly of the tubular member, and a first end of the tubular member terminating in the abutting surface of the compensating flange.

6. A neck frame as claimed in claim 1 in which the second flange merges with the compensating flange in two positions on opposite sides of the tubular member.

7. A neck frame as claimed in claim 1 in which a closure member to close an end of the tubular member adjacent the second flange is provided.

8. A neck frame as claimed in claim 7 in which mounting means are provided on the second flange to pivotally mount the closure member relative to the tubular member, and securing means are provided on the second flange for releasably securing the closure member closed.

9. A container comprising an elongated tubular body portion closed by end caps, and having an opening to provide access to the interior of the container, and a neck frame mounted around the opening, in which the neck frame is a neck frame as claimed in claim 1.

10. A container as claimed in claim 9 in which the opening is provided on the tubular body portion of the container, and the neck frame is mounted around the opening.

* * * * *